United States Patent
Hou et al.

(10) Patent No.: US 7,362,812 B1
(45) Date of Patent: Apr. 22, 2008

(54) CHANNEL TRACKING USING STEP SIZE BASED ON NORM-1 BASED ERRORS ACROSS MULTIPLE OFDM SYMBOLS

(75) Inventors: Ping Hou, San Carlos, CA (US); Yong Li, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 731 days.

(21) Appl. No.: 10/839,265

(22) Filed: May 6, 2004

(51) Int. Cl.
    H04K 1/10 (2006.01)
(52) U.S. Cl. ............... 375/260; 375/149; 375/130; 375/346; 375/354; 375/355
(58) Field of Classification Search .......... 375/260, 375/229, 232
    See application file for complete search history.

(56) References Cited

U.S. PATENT DOCUMENTS

| 5,963,592 A * | 10/1999 | Kim ..................... 375/232 |
| 6,952,394 B1 * | 10/2005 | Kim et al. .................. 370/208 |
| 2003/0063680 A1 * | 4/2003 | Nedic et al. ............... 375/260 |
| 2004/0005010 A1 * | 1/2004 | He et al. ................ 375/260 |

OTHER PUBLICATIONS

IEEE Std. 802.11a-1999, "Part 11: Wireless LAN Medium Access Control (MAC) and Physical Layer (PHY) specifications: High-speed Physical Layer in the 5 GHZ Band", L.AN/MAN Standards Committee of the IEEE Computer Society, IEEE-SA Standards Board, Approved Sep. 16, 1999, New York, USA.

* cited by examiner

Primary Examiner—Mohammed Ghayour
Assistant Examiner—Juan Alberto Torres
(74) Attorney, Agent, or Firm—Manelli Denison & Selter PLLC; Leon R. Turkevich (57) ABSTRACT

A channel tracking module, configured for generating updated equalization coefficients for a frequency equalizer, is configured for determining a digital-based error value between equalized signals output by the frequency equalizer relative to predicted signals, for each subcarrier frequency of an OFDM symbol. The channel tracking module determines an accumulated error based on accumulating the digital-based error values for all the subcarrier frequencies of the OFDM symbol, for a prescribed successive number of OFDM symbols. The channel tracking module also determines a step size based on the accumulated error and relative to a prescribed step function configured for optimizing equalizer adjustments within stability limits. The channel tracking updates the equalization coefficients for each subcarrier frequency based on the accumulated error and the step size. Hence, the channel tracking module can be implemented in an economical manner while ensuring optimum equalizer adjustments within stability limits that ensure convergence of the equalization coefficients.

10 Claims, 6 Drawing Sheets

CHANNEL TRACKING USING STEP SIZE BASED ON NORM-1 BASED ERRORS ACROSS MULTIPLE OFDM SYMBOLS

BACKGROUND OF THE INVENTION

1. Field of the Invention

The present invention relates to implementation of a Channel Estimator in a wireless receiver, for example a IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11a based OFDM PHY in hardware involves providing a cost-effective, compact device that can be implemented in smaller wireless devices. Hence, implementation concerns typically involve cost, device size, and device complexity.

Figure 1:
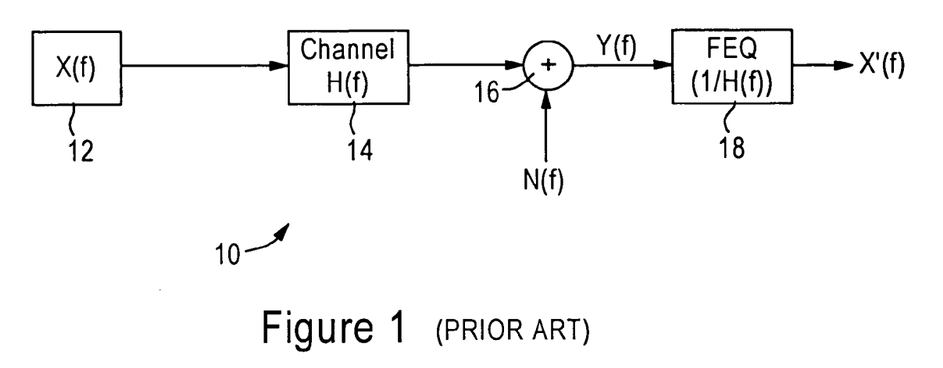
FIG. 1 is a (PRIOR ART) diagram illustrating a frequency based receiver model for equalizing a received signal.

For example, conventional design approaches for a design equalizer would be to determine an estimate of channel effects on a transmitted signal, and implement equalizer coefficients based on the inverse function of the estimate of the channel effects. In particular, FIG. 1 is a diagram illustrating a frequency based receiver model 10, where a transmitter 12 outputs a frequency modulated signal X(f). The frequency modulated signal X(f) encounters frequency-selective channel distortion H(f) 14 (i.e., fading), and white Gaussian noise N(f) 16. Hence, the wireless signal Y(f) received by the receiver can be characterized by the transfer function:

$$Y(f) = X(f)H(f) + N(f).$$

A conventional approach to designing a frequency equalizer 18 would involve obtaining an estimate for the channel distortion H(f), and generating an inverse of the channel distortion, such that an estimate X'(f) of the frequency modulated signal X(f) can be obtained by Y(f)/H(f), or equivalently Y(f)*[1/H(f)]. However, the noise N(f) is included in the received wireless signal Y(f), hence using the inverse of the channel distortion this approach may amplify the channel noise N(f) in the equalized signal:

$$X'(f) = [Y(f) - N(f)] * [1/H(f)].$$

Hence, attempts to equalize the received signal Y(f) may greatly amplify the noise component N(f), to where the amplified noise may even exceed the originally transmitted signal X(f) if the channel distortion value H(f) is small.

Another concern is that an OFDM receiver having equalized the received signal Y(f) may encounter additional distortion due to changes in channel characteristics H(f) over time (t), such that the channel distortion is more accurately characterized as H(f, t). Meanwhile, with more received data, channel tracking can improve the estimation of the channel even if there are little or no changes in the channel character, since the availability of the more received data provides additional information regarding the channel. Hence, channel tracking is necessary to track changes in the channel characteristics H(f, t) over time. Channel tracking may be implemented using various estimation approaches, for example gradient approach, least-mean-squared adaptive approach, Kalman-filter-based approach, etc. In general, an error message is first defined relative to the received signal Y(f) and a predicted signal P(f) that is optimized based on the prescribed design of the OFDM receiver; the error signal and its Euclidean distance is used to find an appropriate correction via some optimization for the current channel estimation.

However, implementation of Euclidean distance calculations is substantially complex because it involves multiplication and square-root calculations. Further, the channel tracking performance and equalizer stability is totally dependent on the optimization for the system design: arbitrary designs risk introducing instability into the OFDM receiver by equalizing the signals to equalized values that do not enable the channel tracking to converge to a stable operation.

SUMMARY OF THE INVENTION

There is a need for an arrangement that enables a wireless transceiver to perform channel tracking of received frequency-modulated signals in an efficient and economical manner.

There also is a need for an arrangement that enables a wireless transceiver to perform channel tracking of a received frequency-modulated signal with optimum stability that ensures convergence to stable equalizer settings, despite substantial changes in the channel characteristics over time.

There also is a need for an arrangement that enables a wireless transceiver to perform channel tracking of received frequency-modulated signals, based on monitoring errors accumulated over subcarrier frequencies of a given OFDM symbol, and based on monitoring the errors relative to multiple successive OFDM symbols.

These and other needs are attained by the present invention, where a channel tracking module, configured for generating updated equalization coefficients for a frequency equalizer, is configured for determining a digital-based error value between equalized signals output by the frequency equalizer relative to predicted signals, for each subcarrier frequency of an OFDM symbol. The channel tracking module determines an accumulated error based on accumulating the digital-based error values for all the subcarrier frequencies of the OFDM symbol, for a prescribed successive number of OFDM symbols. The channel tracking module also determines a step size based on the accumulated error and relative to a prescribed step function configured for optimizing equalizer adjustments within stability limits. The channel tracking updates the equalization coefficients for each subcarrier frequency based on the accumulated error and the step size. Hence, the channel tracking module can be implemented in an economical manner while ensuring optimum equalizer adjustments within stability limits that ensure convergence of the equalization coefficients.

One aspect of the present invention provides a method in an OFDM receiver for updating equalizer coefficients for equalization of a received wireless OFDM signal by a frequency equalizer. The method includes first determining, for each subcarrier frequency of an OFDM symbol, a digital-based error value between an equalized signal output by the frequency equalizer and a prescribed predicted signal optimized for the OFDM receiver. The method also includes second determining an accumulated error based on accumulating the digital-based error values of the respective subcarrier frequencies in the OFDM symbol with respective digital-based error values for a prescribed successive number of OFDM symbols. The method also includes third determining a step size based on the accumulated error relative to a prescribed step function configured for optimizing the equalizer coefficients within prescribed stability limits. Updated equalizer coefficients are generated for the respective subcarrier frequencies based on applying a correction factor to the equalizer coefficients, the correction factor based on the accumulated error and the step size.

Another aspect of the present invention provides an OFDM receiver comprising a frequency equalizer, a channel estimator, and a channel tracking module. The frequency equalizer is configured for equalizing a received wireless signal for a selected frequency based on a corresponding equalization coefficient. The channel estimator is configured for determining the equalization coefficient for the selected frequency based on identified first and second long preambles within the received wireless signal. The channel tracking module is configured for updating the equalization coefficient for the selected frequency. In particular, the channel tracking module determines, for each subcarrier frequency of an OFDM symbol, a digital-based error value between an equalized signal output by the frequency equalizer and a prescribed predicted signal optimized for the OFDM receiver. The channel tracking module determines an accumulated error based on accumulating the digital-based error values of the respective subcarrier frequencies in the OFDM symbol with respective digital-based error values for a prescribed successive number of OFDM symbols. The channel tracking module also determines a step size based on the accumulated error relative to a prescribed step function configured for optimizing the equalizer coefficients within prescribed stability limits, and generates updated equalizer coefficients for the respective subcarrier frequencies based on applying a correction factor to the equalizer coefficients, the correction factor based on the accumulated error and the step size.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11a OFDM transceiver, followed by a detailed description of the channel estimator implemented according to an embodiment of the present invention.

Receiver Architecture Overview

Figure 2:
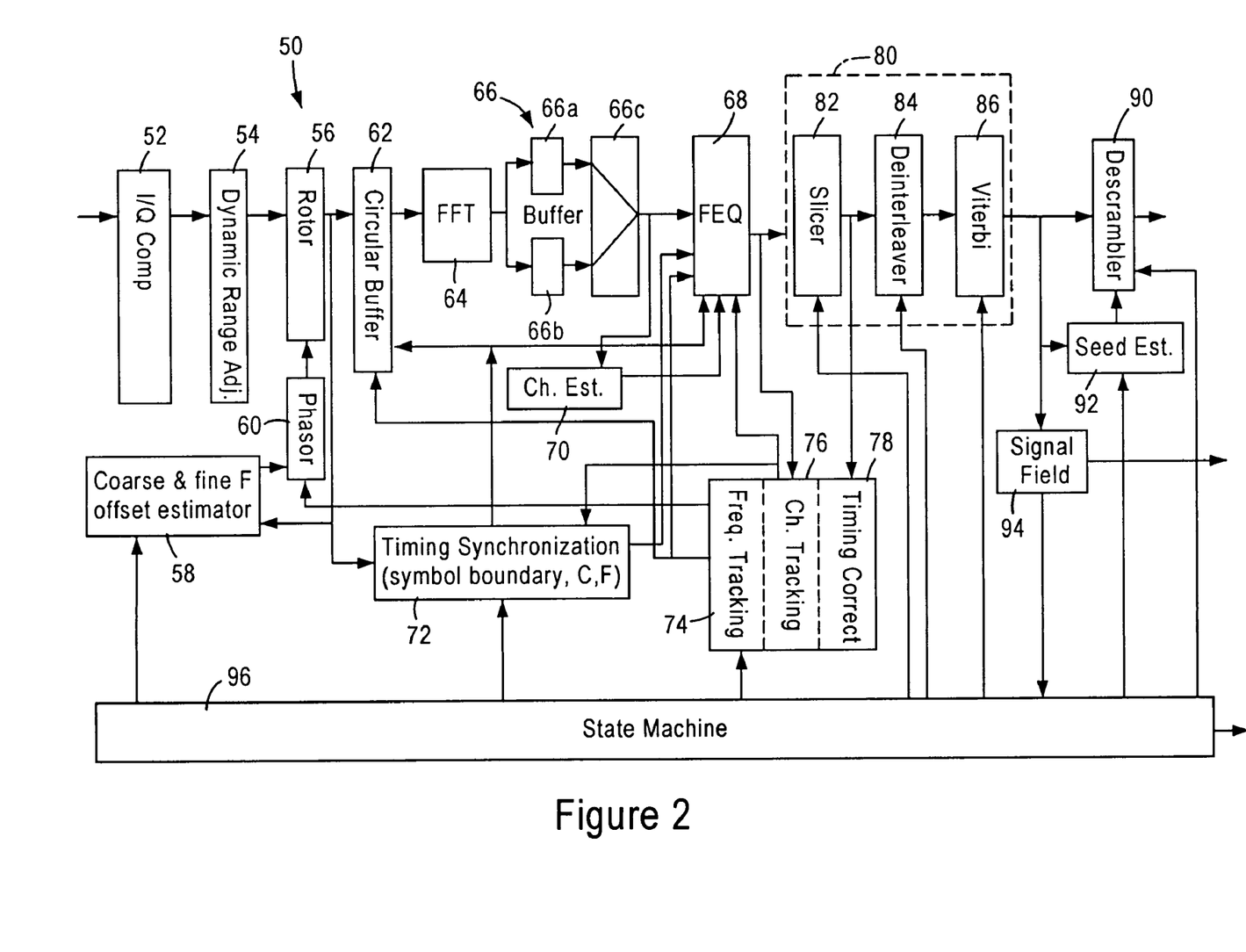
FIG. 2 is a diagram illustrating a receiver module of an IEEE 802.11a OFDM transceiver having a deinterleaver implemented according to an embodiment of the present invention.

FIG. 2 is a diagram illustrating an architecture of a receiver module 50 of an IEEE 802.11a Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F front end, for example a receiver amplifier. The detected wireless signal samples include an I component and Q component: these I and Q components, which normally should be orthogonal to each other and have a uniform relative gain, may in fact have a non-orthogonal phase difference (i.e., other than 90 degrees) and have a nonequal gain. Hence, the I/Q mismatch compensation module is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1-6) bits of information. According to the IEEE 802.11a/g specification, the physical layer data packet should include a short training sequence, two identical long training sequences, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer (FEQ) 68 is configured for reversing the fading encountered by the tones in order to provide equalized tones. Channel information is obtained by the channel estimator 70 from the long training sequences in the IEEE 802.11a preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11a specification.

The descrambler circuit 90 is configured for recovering the original serial bit stream from the decoded data, by descrambling a 127-bit sequence generated by the scrambler of the transmitter, according to the IEEE 802.11a specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11a compliant Media Access Controller (MAC).

Channel Estimator Based on Minimum Equalization Error

Figure 3:
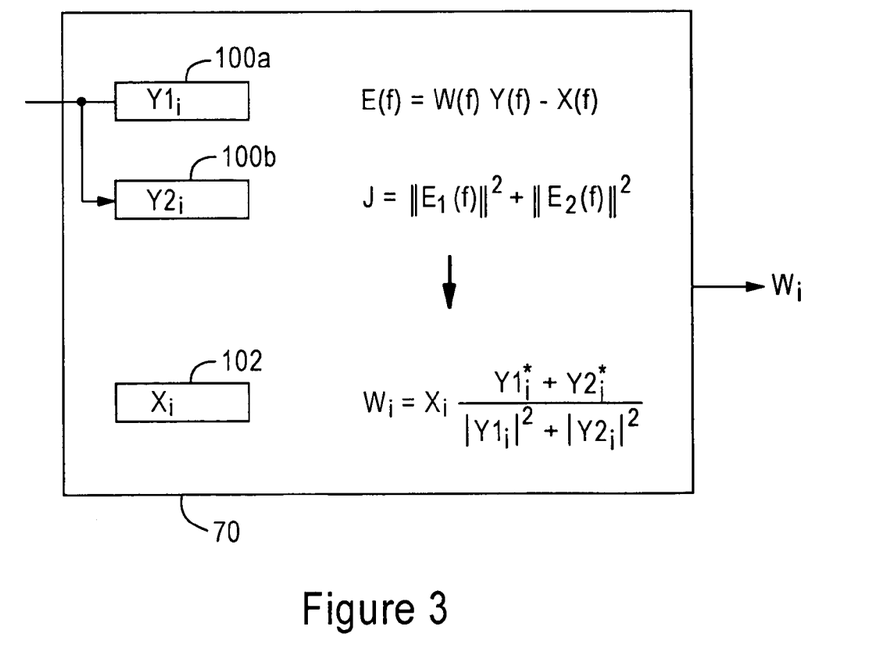
FIG. 3 is a block diagram illustrating a channel estimator configured for supplying equalization coefficients to the frequency equalizer of FIG. 2, according to an embodiment of the present invention.

FIG. 3 is a diagram illustrating in detail the channel estimator 70 of FIG. 2, according to an embodiment of the present invention. The channel estimator 70 is configured for identifying the first and second long preambles 100a, 100b from the received wireless signal, each stored in internal latches. In particular, Section 17.3.3 of the IEEE 802.11a Specification describes that the preamble field, used for synchronization, includes ten (10) short symbols and two identical long symbols. The long symbols 100a, 100b include 53 subcarriers (including a zero value at DC) which are modulated according to a prescribed sequence. Hence, these prescribed long symbols can be determined by the channel estimator 70 for each tone, illustrated in FIG. 3 as $X_i$ 102. The prescribed long symbols $X_i$ for each of the 53 subcarrier frequencies can be stored internally within the channel estimator 70 in a nonvolatile memory.

As described above, the received wireless signal encounters channel fading, characterized by H(f); hence, the first preamble $Y1_i$ and the second preamble $Y2_i$ for a given tone "i" may have a value that differs from the originally transmitted value $X_i$.

According to the disclosed embodiment, the channel estimator 70 is configured for determining an equalization coefficient $W_i$ for the selected frequency "i" based on the first and second long preambles $Y1_i$ and $Y2_i$, relative to a prescribed preamble value $X_i$ for the selected frequency. In particular, for either of the long preambles, equalization error can be defined as follows:

$$E(f)=W(f)Y(f)-X(f),$$

where W(f) is the estimate for the inverse of H(f).

Further, the channel estimator 70 utilizes the cost function J to measure equalization error over the two long preambles Y1 and Y2:

$$J=\|E_1(f)\|^2+\|E_2(f)\|^2$$

Since the values Y(f) and X(f) are known, the equalization coefficient W(f) can be obtained by minimizing the cost function J. In particular, the minimizing of the cost function J can be approximated by setting the error for a given preamble to zero E(f)=0, resulting in the expression: W(f)=X(f)/Y(f).

Since the symbol values are complex values Y=x+yj, where j represents a complex component unit (i.e., the square root of −1), the expression W(f)=X(f)/Y(f) can be resolved by applying complex conjugate values Y*=x−yj, resulting in the following expression for the complex coefficient $W_i$:

$$W_i = X_i[Y1^*_i + Y2^*_i]/[|Y1_i|^2 + |Y2_i|^2]$$

or $$W_i = X_i Z_i,$$

where $Z = [Y1^*_i + Y2^*_i]/[|Y1_i|^2 + |Y2_i|^2]$.

Figure 4:
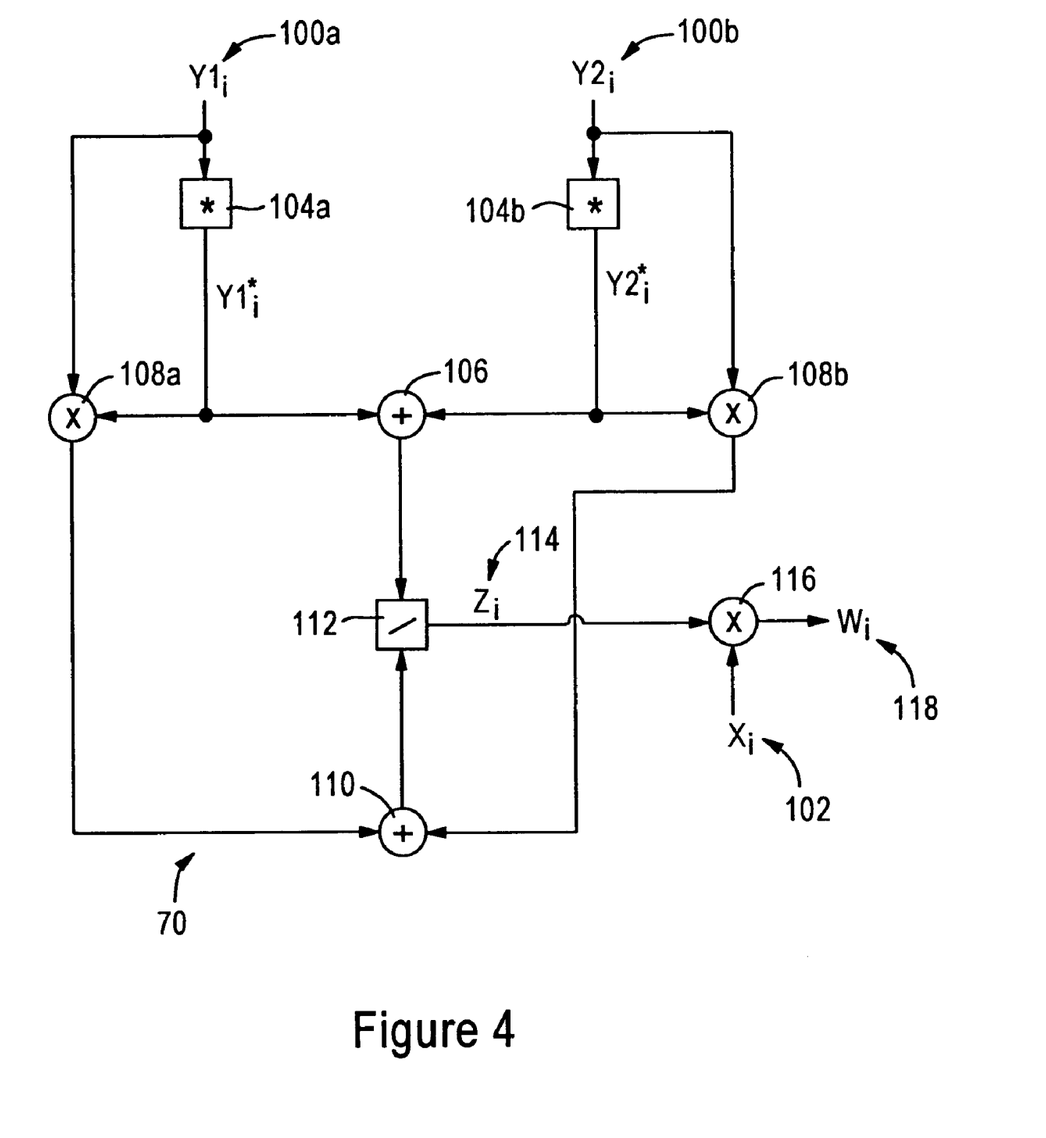
FIG. 4 is a diagram illustrating in detail the channel estimator of FIG. 3, according to an embodiment of the present invention.

FIG. 4 is a diagram illustrating in further detail an implementation of the minimum equalization error based channel estimator 70, according to an embodiment of the present invention. The channel estimator 70 includes complex conjugate generators 104a and 104b configured for generating complex conjugate values for the first and second long preambles 100a and 100b, respectively. The complex conjugate values $Y1^*_i$ and $Y2^*_i$ output by the respective complex conjugate generators 104a and 104b are applied to an adder circuit 106 configured for outputting the sum of the complex conjugate values.

The complex conjugate values $Y1^*_i$ and $Y2^*_i$ also are output to respective multiplier circuits 108a and 108b to obtain the square magnitudes $|Y1_i|^2$ and $|Y2_i|^2$ of the respective first and second long preambles 100a and 100b. The square magnitudes are summed by an adder circuit 110.

The sum of the complex conjugate values are output from the adder 106 to a divider 112. The divider 112 divides the output from the adder 106 with the summed square magnitudes output by the adder circuit 110. The divider 112 outputs a complex coefficient $Z_i$ 114, specifying the sum of the complex conjugate values relative to the sum of the square magnitudes, to a multiplier 116. The multiplier 116 multiplies the complex coefficient $Z_i$ 114 with the prescribed preamble value Xi 102 to obtain the coefficient value 118 $W_i$ for use by the equalizer 68 of FIG. 2 at the corresponding tone i. The process is repeated for each of the tones i.

According to the disclosed embodiment, equalizer coefficients for a frequency equalizer can be efficiently determined based on estimating the minimum equalization error. Use of the square magnitudes also corresponds to minimizing error energy, since energy is proportional to the square of the magnitudes. Hence, the cost function is consistent with minimizing the energy within the error component. Moreover, equalization can be performed without amplifying the channel noise.

In addition, the channel estimator 70 enables a linear coefficient to be calculated. In particular, if the received signal to the channel estimator 70 is scaled by a factor k (k being a positive real number), the estimator output W(f) is correspondingly scaled by a factor of 1/k. Hence, the equalized output W(f) Y(f) is independent of the factor k, helping to mitigate improper adjustment of signal power by dynamical range.

Figure 5:
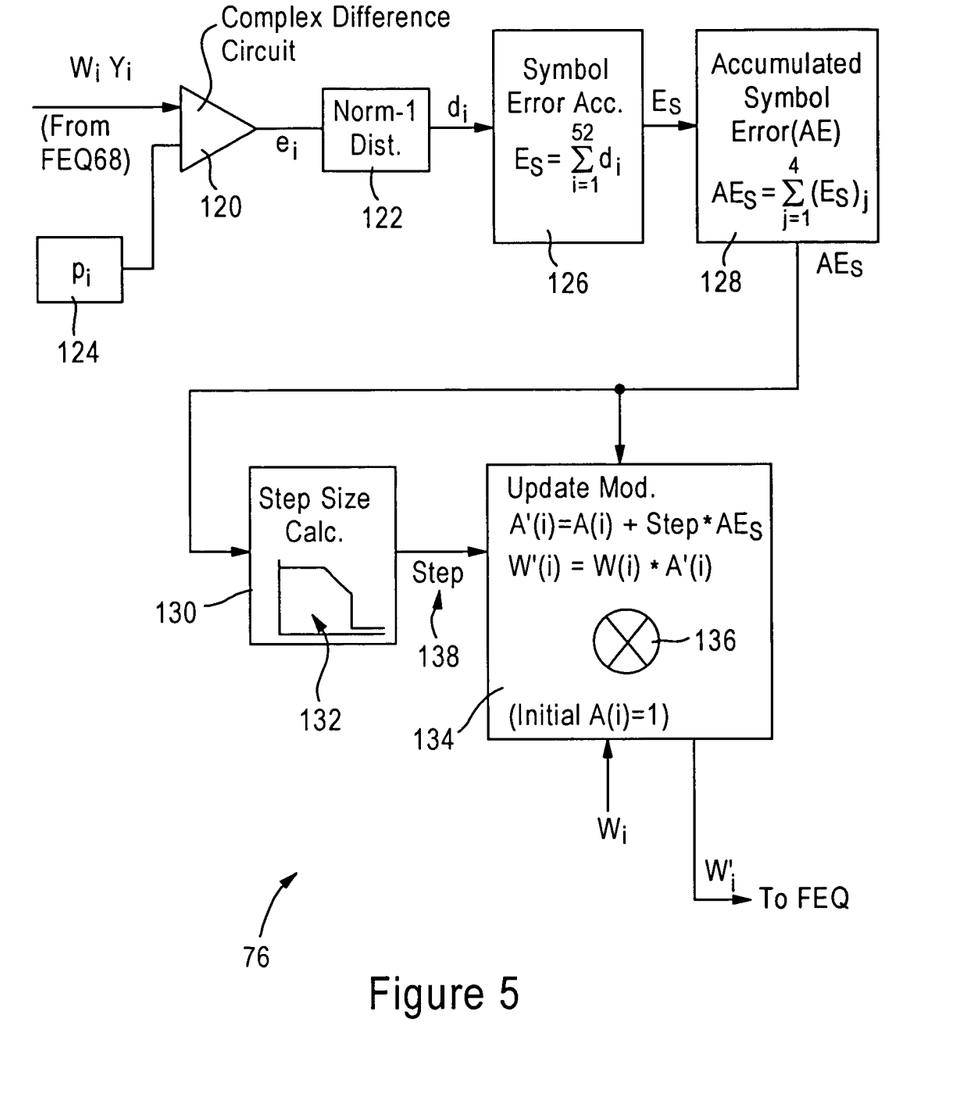
FIG. 5 is a diagram illustrating the channel tracking module of FIG. 2, according to an embodiment of the present invention.

Channel Tracking Using Step Size Based on
Norm-1 Based Errors Across Multiple Symbols FIG. 5 is a diagram illustrating the channel tracking module 76 of FIG. 2, according to an embodiment of the present invention. The channel tracking module 76 includes a complex difference circuit 120, a norm-1 distance calculator 122, and a nonvolatile memory 124 configured for storing prescribed predicted signal values ($P_i$) for each subcarrier frequency (i) that represents an optimized value for the OFDM receiver 50. The channel tracking module 76 also includes a symbol error accumulator 126, an accumulated symbol error module 128, a step size calculator module 130 configured for calculating a step size based on a prescribed step function 132, and an update module 134 including a multiplier 136.

The complex difference circuit 120 is configured for determining, for each subcarrier frequency (i) of an OFDM symbol, a complex error value ($e_i$) based on determining a complex difference between the equalized signal ($W_i Y_i$) output by the frequency equalizer 68, and the prescribed predicted signals ($P_i$) stored in the memory 124. In particular, the prescribed predicted signals ($P_i$) represent optimized complex signal values for each received signal modulated at the corresponding subcarrier frequency (i) according to the design of the OFDM receiver 50. The prescribed predicted signals ($P_i$) are based on optimum signal parameters based on the design of the components of the OFDM receiver 50 as illustrated in FIG. 2.

The norm-1 distance calculator 122 is configured for calculating a digital-based error value ($d_i$) for each corresponding complex error value ($e_i$) using prescribed norm-1 distance calculation techniques. In particular, the norm-1 distance calculator 122 eliminates the necessity for Euclidean distance calculation (which requires floating-point square root calculation), and hence dramatically reduces the computation load in the channel tracking module 76. Hence, use of a digital-based error value reduces power requirements and circuit size when implemented in silicon, as well as shortening decoding latency.

The symbol error accumulator 126 is configured for determining an accumulated error value (Es) for each OFDM symbol based on a summation of all the digital-based error values ($d_i$) over all the subcarrier frequencies, namely the 52 tones specified in the IEEE Standard 802.11a. In particular, each OFDM symbol includes 52 tones, where typically each tone is assumed independent of adjacent tones in the frequency domain; consequently, 52 independent tracking algorithms could be implemented. However, such an independent approach fails to consider that a signal modulated by a given tone has frequency components that overlap with the frequency components of a signal modulated at an adjacent tone. Hence, each OFDM symbol is considered as a sample for channel tracking, and as such the disclosed embodiment jointly optimizes the 52 tones within each OFDM symbol. Not only is design of the channel tracking module 76 simplified, but the disclosed arrangement provides a global optimization solution since the assumption of independent tones can be applied as a special case to the channel tracking module 76.

The accumulated symbol error module 128 is configured for accumulating the accumulated error values (Es) for a respective prescribed successive number of OFDM symbols, in order to generate an accumulated error (AEs). As illustrated in FIG. 5, the accumulated symbol error module 128 is configured for summing the respective accumulated error values (Es) for four (4) successive OFDM symbols (j), in order to track any time-varying changes in the channel characteristics. Hence, the accumulated symbol error module 128 outputs a new accumulated error (AEs) for every four consecutive OFDM symbols.

The step size calculator module 130 is configured for calculating the step size ("step") 138 according to a prescribed step function 132. The step size 138 limits the effect of the accumulated error (AEs) in modifying the equalizer coefficients in order to ensure that instability is not introduced that would prevent convergence of the equalizer coefficients for the frequency equalizer 68.

Figure 7:
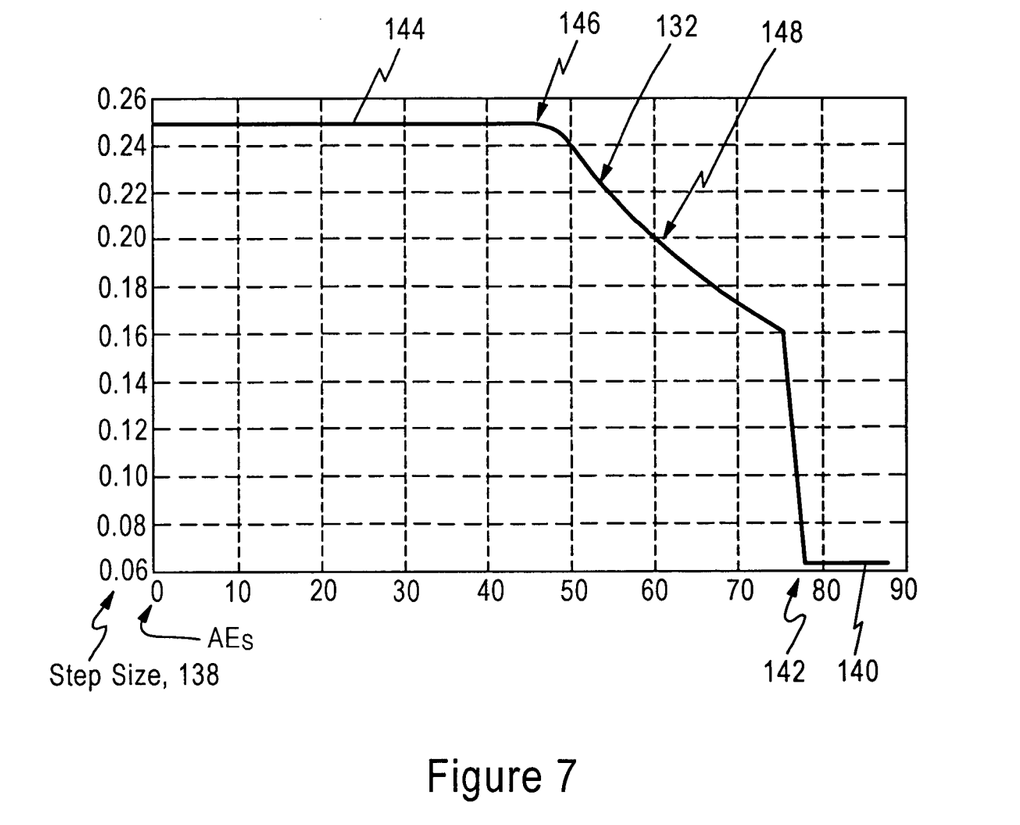
FIG. 7 is a diagram illustrating in detail the step size function utilized by the step size calculator of FIG. 6.

FIG. 7 is a diagram illustrating in further detail the step function 132. The step function 132 includes a first limit value 140 configured for limiting the step size 138 based on the accumulated error (AEs) having exceeded a prescribed threshold 142 (e.g., AEs>78). The step function 132 also includes a second limit value 144 configured for setting the step size 138 to a prescribed maximum value based on the accumulated error (AEs) being below a corresponding threshold 146 (e.g., AEs<47). The step function 132 also includes a nonlinear portion 148 between the threshold 142 and 146, for mapping the step size 138 based on the accumulated error (AEs).

Hence, the step size 138 determines the relative influence of the accumulated error (AEs) in modifying the equalizer coefficients ($W_i$), such that the influence of substantially small accumulated errors is "amplified" by the step limit value 144, and the influence of substantially large accumulated errors is "attenuated" by the step limit value 140.

As illustrated in FIG. 5, the step value 138, the accumulated error (AEs), and the original equalizer coefficients ($W_i$) are supplied to the update module 134. The update module 134 is configured for generating a correction factor (A'(i)) for each subcarrier frequency (i) based on multiplying the accumulated error (AEs) and the step size 138 during a first phase of the 4 successive OFDM symbols using a multiplier 136. The update module 134 then adds the product of the accumulated error (AEs) and the step size (step) to an initial correction factor (A(i)). Initially the initial correction factor is set to equal 1 (A(i)=1), however the update module 134 updates the correction factor as each new accumulated error is output from the accumulated symbol error module 128, and a new step value 138 is output from the step size calculator 130.

The update module 134 generates the updated equalizer coefficients ($W'_i$) by supplying the equalizer coefficients ($W_i$) and the correction factor (A'(i)) to the multiplier 136 during a second phase of the time interval for processing the 4 successive OFDM symbols. Hence, the time-division approach for utilizing the multiplier 136 reduces hardware requirements.

Figure 6:
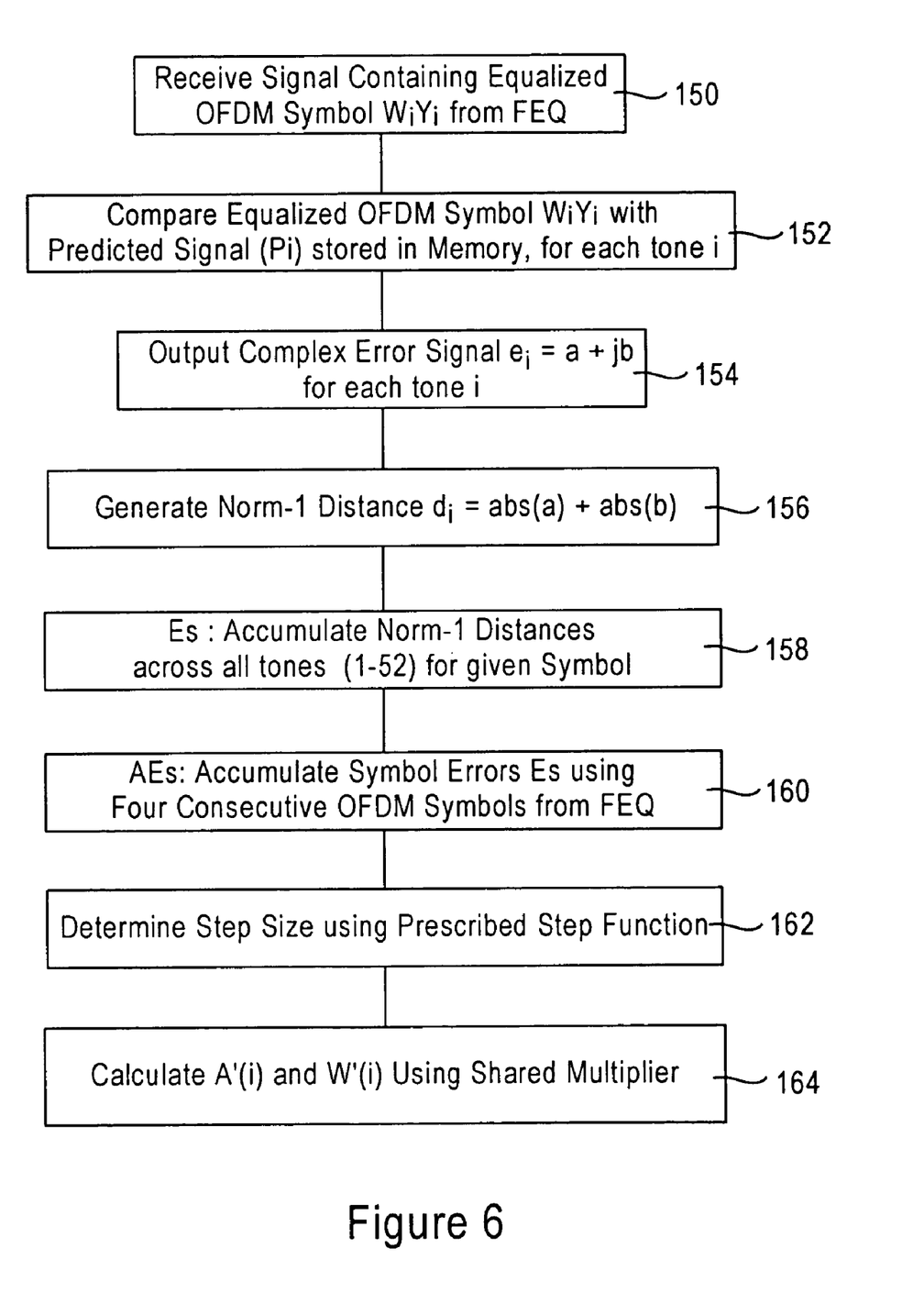
FIG. 6 is a diagram illustrating the method by the channel tracking module of FIG. 5 of updating the equalization coefficients based on generating a step size value based on accumulation of norm-1 based errors across multiple symbols, according to an embodiment of the present invention.

FIG. 6 is a diagram illustrating the method of updating equalizer coefficients, according to an embodiment of the present invention. The complex difference circuit 120 receives in step 150 the equalized symbols from the frequency equalizer 68, and the predicted signals (P1) from the memory 124 for each subcarrier frequency (i), and compares in step 152 each OFDM symbol component with the corresponding predicted signal component for each tone (i). The complex difference circuit 120 outputs in step 154 the complex error signal ($e_i$), and the norm-1 distance calculator 122 outputs in step 156 the corresponding digital-based error value ($d_i$) for each tone (i).

The symbol error accumulator 126 generates the accumulated error value (Es) in step 158 based on summing the digital distances across all 52 tones for the given OFDM symbol, and the accumulated symbol error module 128 generates in step 160 the accumulated error (AEs) based on the accumulating the symbol errors (Es) using four consecutive OFDM symbols. The step size calculator 130 determines in step 162 the step size based on the prescribed step function 132, and the update module 134 calculates in step 164 the correction factor (A'(i)) and the updated equalizer coefficients (W'(i)). The update module 134 outputs the updated equalizer coefficients to the equalizer 68 for utilizing the received OFDM signals based on changes in a channel detected by the channel tracking module 76.

According to the disclosed embodiment, the channel tracking system provides an economic arrangement for monitoring while maintaining stability by preventing diversions in the equalizer coefficients due to a substantial change in distance measurements.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM receiver for updating equalizer coefficients for equalization of a received wireless OFDM signal by a frequency equalizer, the method including:
   first determining, for each subcarrier frequency of an OFDM symbol, a digital-based error value between an equalized signal output by the frequency equalizer and a prescribed predicted signal optimized for the OFDM receiver;
   second determining an accumulated error based on accumulating the digital-based error values of the respective subcarrier frequencies in the OFDM symbol with respective digital-based error values for a prescribed successive number of OFDM symbols;
   third determining a step size based on the accumulated error relative to a prescribed step function configured for optimizing the equalizer coefficients within prescribed stability limits; and
   generating updated equalizer coefficients for the respective subcarrier frequencies based on applying a correction factor to the equalizer coefficients, the correction factor based on the accumulated error and the step size.

2. The method of claim 1, wherein the first determining step includes:
   generating, for said each subcarrier frequency, a complex error value based on a complex difference between the equalized signal and the prescribed predicted signal; and
   calculating each said digital-based error value as a norm-1 distance of the corresponding complex error value.

3. The method of claim 2, wherein the prescribed step function includes a first limit value for limiting the step size based on the accumulated error having exceeded a corresponding first threshold, a second limit value for setting the step size based on the accumulated error being below a corresponding second threshold, and a third portion for mapping step size between the first and second limit values based on the accumulated error being between the first and second thresholds.

4. The method of claim 3, wherein the generating step includes:
   first generating the correction factor by adding a product of the accumulated error and the step size to a previous correction factor; and
   second generating the updated equalizer coefficients by multiplying the respective equalizer coefficients with the correction factor.

5. The method of claim 4, wherein:
   the first generating step includes supplying the accumulated error and the step size to a multiplier during a first phase of a two-phase interval based on the reception of the prescribed successive number of OFDM symbols; and the second generating step includes supplying the equalizer coefficients and the correction factor to the multiplier during a second phase of the two-phase interval.

6. An OFDM receiver comprising:
a frequency equalizer configured for equalizing a received wireless signal for a selected frequency based on a corresponding equalization coefficient;
a channel estimator configured for determining the equalization coefficient for the selected frequency based on identified first and second long preambles within the received wireless signal; and
a channel tracking module configured for updating the equalization coefficient for the selected frequency based on: (1) determining, for each subcarrier frequency of an OFDM symbol, a digital-based error value between an equalized signal output by the frequency equalizer and a prescribed predicted signal optimized for the OFDM receiver, (2) determining an accumulated error based on accumulating the digital-based error values of the respective subcarrier frequencies in the OFDM symbol with respective digital-based error values for a prescribed successive number of OFDM symbols, (3) determining a step size based on the accumulated error relative to a prescribed step function configured for optimizing the equalizer coefficients within prescribed stability limits, and (4) generating updated equalizer coefficients for the respective subcarrier frequencies based on applying a correction factor to the equalizer coefficients, the correction factor based on the accumulated error and the step size.

7. The receiver of claim 6, wherein the channel tracking module includes:
error determining means for generating, for said each subcarrier frequency, a complex error value based on a complex difference between the equalized signal and the prescribed predicted signal; and
means for calculating each said digital-based error value as a norm-1 distance of the corresponding complex error value.

8. The receiver of claim 7, wherein the channel tracking module further includes means for calculating the step size based on the prescribed step function, the prescribed step function including a first limit value for limiting the step size based on the accumulated error having exceeded a corresponding first threshold, a second limit value for setting the step size based on the accumulated error being below a corresponding second threshold, and a third portion for mapping step size between the first and second limit values based on the accumulated error being between the first and second thresholds.

9. The receiver of claim 8, wherein the channel tracking module further includes an update module having a multiplier, the update module configured for generating the correction factor by adding a product of the accumulated error and the step size to a previous correction factor, and generating the updated equalizer coefficients by multiplying the respective equalizer coefficients with the correction factor.

10. The receiver of claim 9, wherein:
the update module is configured for supplying the accumulated error and the step size to the multiplier during a first phase of a two-phase interval based on the reception of the prescribed successive number of OFDM symbols; and
the update module is configured for supplying the equalizer coefficients and the correction factor to the multiplier during a second phase of the two-phase interval.

* * * * *